United States Patent [19]

Bertolini

[11] Patent Number: 4,991,351
[45] Date of Patent: Feb. 12, 1991

[54] FIXED COUPLING DEVICE BETWEEN A WINDOW AND A WINDOW-RAISER MECHANISM IN A VEHICLE

[75] Inventor: Carlo Bertolini, Paris, France

[73] Assignee: Rockwell-CIM, France

[21] Appl. No.: 411,822

[22] Filed: Sep. 25, 1989

[30] Foreign Application Priority Data

Sep. 29, 1988 [FR] France .................................. 88 12761

[51] Int. Cl.⁵ .............................................. E05F 11/48
[52] U.S. Cl. ......................................... 49/351; 49/475
[58] Field of Search .................. 49/351, 350, 374, 375, 49/376, 377, 502

[56] References Cited

U.S. PATENT DOCUMENTS 2,026,719  1/1936  Westrope ........................ 49/351 X
4,694,610  9/1987  Hornivius ........................ 49/351

FOREIGN PATENT DOCUMENTS 1410680  10/1975  United Kingdom ................. 49/351

Primary Examiner—Philip C. Kannan

[57] ABSTRACT

A coupling device for connecting an automobile window to a window operator in which a glass support section (42) is provided with a rigid part (45) and a flexible part (46) that cooperate to grip a connector on the window operator and provide universal angular rotation between the coupling device and the operator mechanism.

6 Claims, 5 Drawing Sheets

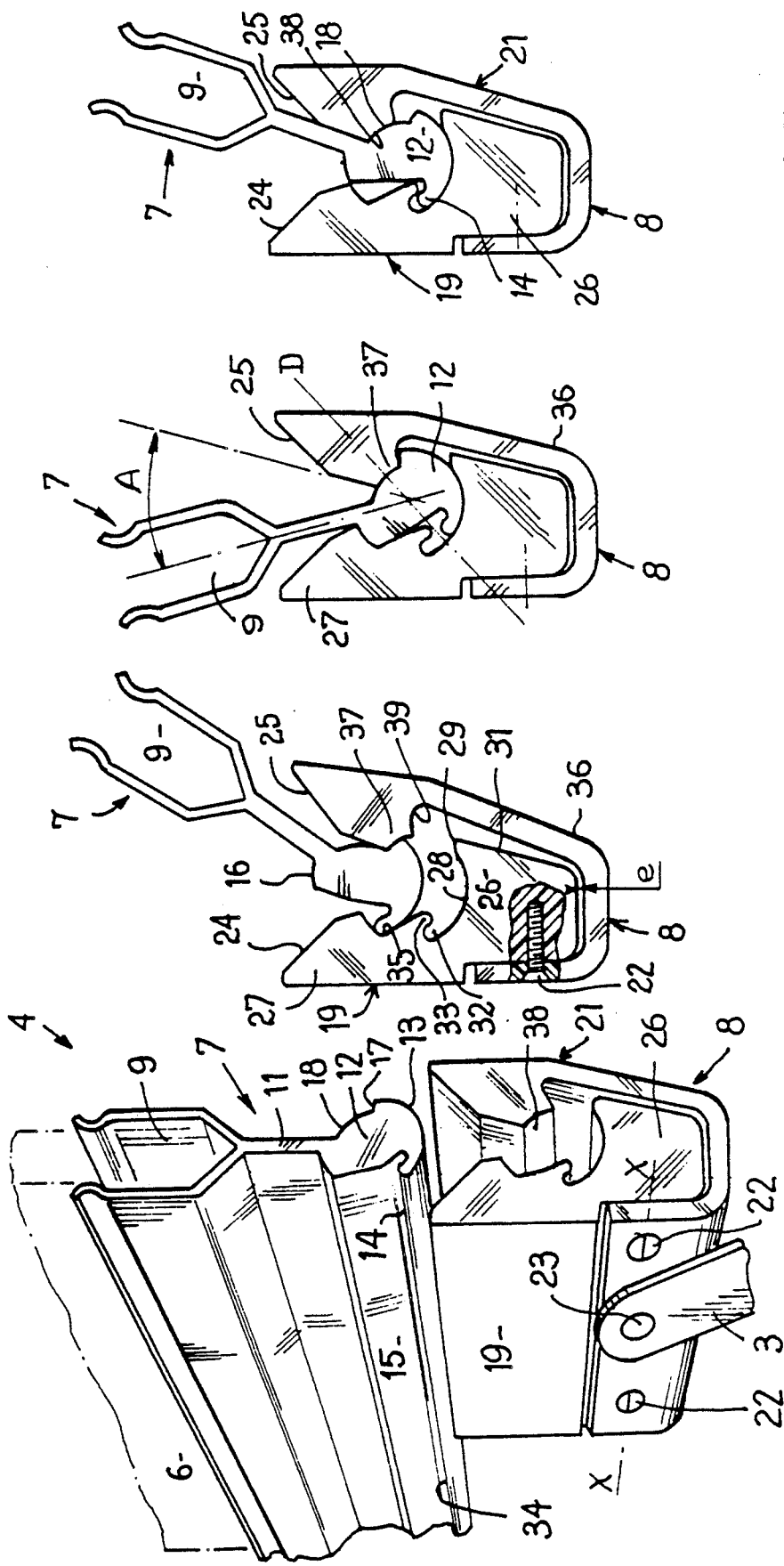

FIXED COUPLING DEVICE BETWEEN A WINDOW AND A WINDOW-RAISER MECHANISM IN A VEHICLE

The subject of the present invention is a coupling device between a window and a window-raiser mechanism in a motor vehicle.

As is known, windows have to be fitted to the corresponding window-raiser mechanisms in vehicle doors manually on the vehicle assembly lines. For this purpose, the operator brings the end runners or rollers of the arms of the window raiser into slideways fastened to the bottom of the window. These operations, which are partly carried out "blind", are too complex for it to be possible for a robot to execute them within the framework of the automation of motor vehicle assembly lines.

The object of the invention is, therefore, to make a coupling device of such a kind that the coupling can be made by a robot carrying the window, without any manual involvement.

According to the invention, the coupling device comprises, in combination, a section equipped with means for obtaining, by snapping, a swivel joint of the said section on a sphere carried by the arm or by the window, whilst, conversely, the said section is fastened to the window or articulated on the arm, the snap coupling being carried out by shifting the window substantially in its plane and in that of its movement, thus giving the sphere, after snapping, three degrees of freedom in terms of rotation relative to the section.

Since the movement of the window is a substantially vertical translational motion, the arrangement according to the invention makes it possible for a robot to carry out automatically the interlocking of the two sections by snapping.

According to other particular features of the invention:

the section comprises a rigid part and a flexible part articulated elastically on the rigid part, so as normally to be returned and kept bearing against the said rigid part, forming with the latter a gripper capable of retaining the sphere as a result of the snapping of the elastic part onto the rigid part, receptacles of mutually complementary form are arranged opposite one another in the mutually confronting faces of the two parts of the section and are designed for receiving the sphere, and a widened indentation, intended for the introduction of the sphere and formed in the edge of the said part, opens into the receptacle of the rigid part.

Other particular features and advantages of the invention will emerge from the following description made with reference to the accompanying drawings which illustrate one embodiment of it by way of non-limiting example.

FIG. 2 is a partial exploded perspective view of one of the two coupling devices according to the invention which can be seen diagrammatically in FIG. 1.

FIGS. 3, 4 and 5 are cross-sectional views of the two sections of the device of FIG. 2, illustrating a coupling sequence.

Figure 1:
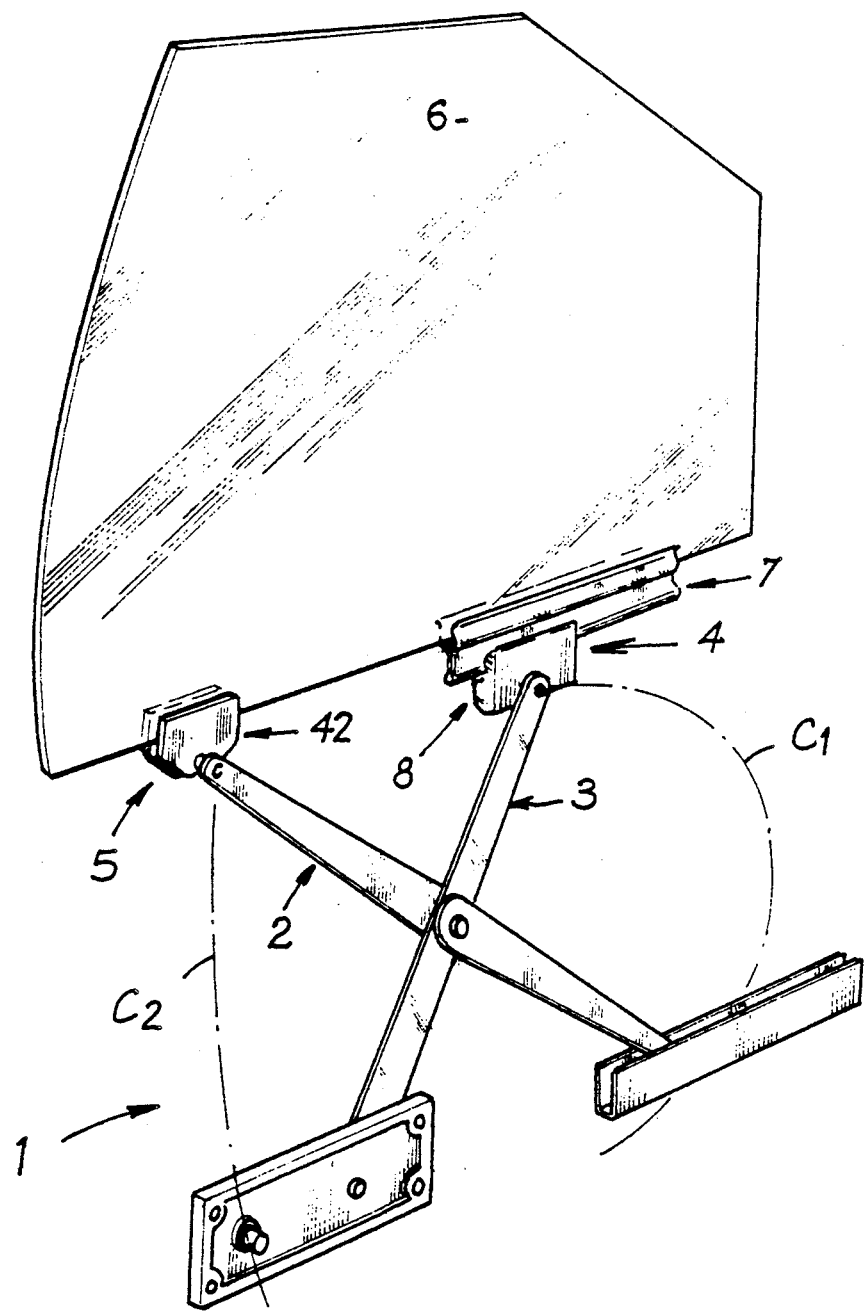
FIG. 1 is a simplified perspective view of a window-raiser mechanism and of the corresponding window of a door (not shown) of a motor vehicle.
Figure 6:
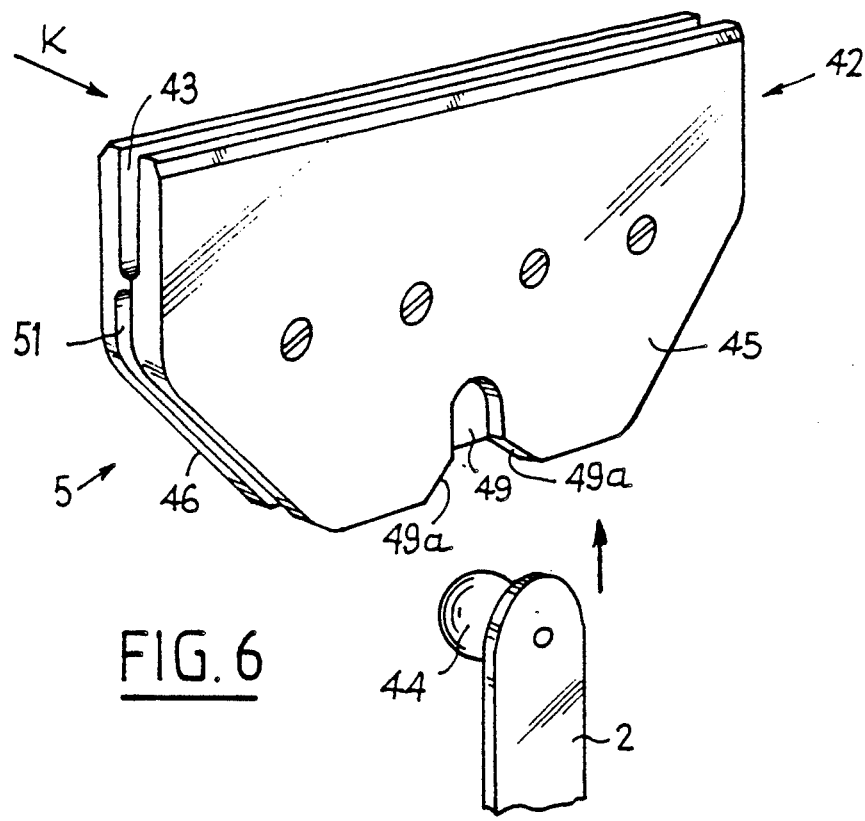
FIG. 6 is an exploded perspective view of a second embodiment of the coupling device according to the invention, equipping one of the arms of the window raiser which can be seen in FIG. 1.
Figure 7:
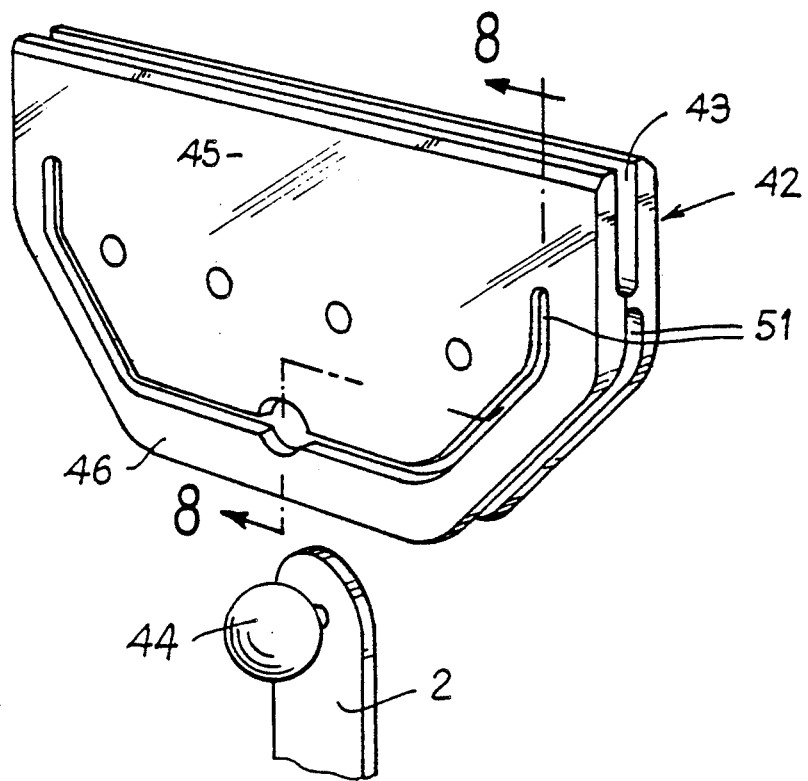
FIG. 7 is a perspective view of the device according to the arrow K in FIG. 6, that is to say from the side of the rear face of the section receiving the window.

The device illustrated in FIG. 1 comprises a window-raiser mechanism 1 produced in a way known per se so that it can be accommodated in a vehicle door (not shown). It comprises particularly two drive arms 2, 3 for supporting a window 6 by means of two respective coupling devices 5 and 4 the drive arms 2, 3 are connected to a suitable source of operating power, which may be either manual or motor in nature.

The joints of the arms 2 and 3 are designed in such a way that, during the raising and lowering of the window 4, the upper end of the arm 3 describes a semicircular curve C1, whilst the upper end of the arm 2 follows an almost straight path C2. In fact, the coupling device 4 is arranged so as to allow a sliding shift of one of its component elements in relation to the window 6, this not being true of the coupling device 5.

The coupling device 4 comprises (FIGS. 2 to 5), in combination, two matching sections 7 and 8: the first section 7 is designed so that it can be fastened to the bottom of the window 6 and for this purpose possesses a longitudinal groove 9 in the form of a U directed upwards, the second section 8 being arranged so as to be articulated on the arm 3.

The cross-sections of the sections 7 and 8 are such that the first section 7 can be engaged by snapping and by being shifted substantially in the general plane of the window 6 and of the movement of the latter, the matching cross-sections of the two sections 7, 8 defining one degree of rotation and one degree of translational motion of the section 8 in relation to the section 7.

The bottom of the groove 9 is extended by a central web 11 which is itself extended by a more solid end part 12. The lower surface 13 of this part 12 is rounded (convex) and is limited on one side by a curved lip 14 projecting laterally in cross-section and extending longitudinally over the entire length of the section 7. Beyond the lip 14 extends a plane surface 15 connected to the base of the web 11 by means of an inclined step 16 and separated from the lip 14 by a longitudinal groove 34. On the opposite side to the projecting lip 14, the convex surface 13 is limited by a radial offset 17 extended by a convex surface 18.

The second section 8 is open in the form of a funnel and consists of two branches fastened to one another: a rigid inflexible branch 19, on which is articulated a flexible branch 21 fastened to the branch 19, for example by means of screws 22. The alignment of the heads of the screws 22 defines the longitudinal axis X—X of articulation of the branch 21 which surrounds the base of the branch 19 substantially beyond the fastening screws 22 and the pivot axle 23 of the section 8 on the arm 3. The mutually confronting upper edges 24 and 25 of the branches 19 and 21 are inclined towards one another, so as to delimit between them an orifice in the form of a funnel (as seen in cross-section). This funnel makes it possible to introduce the end part 12 of the section 7 between the two branches 19 and 21 by snapping, as a result of the spacing apart of the branch 21.

The rigid branch 19 comprises a solid part 26 receiving the screws 22 and extending in the lower part of the branch 21, with a suitable gap e between them. This solid part 26 is extended by a thinner upper part 27 terminating in the inclined edge 24. The solid part 26 has a concave inner bearing surface 28 for the section 7, and for this purpose the radius of curvature of the concave surface 28 corresponds to that of the convex surface 13.

The surface 28 is limited, on one side, by a cant 29 forming the intersection of the side 31 with the surface 28, whilst, on the opposite side, the surface 28 is connected to the bottom of a clearance 32 of a form complementary to that of the lip 14, so as to be capable of receiving the latter when the two sections 7, 8 are completely engaged (FIG. 5). The clearance 32 is delimited, above the surface 28, by a projecting lip 33 of a size allowing it to be introduced into the corresponding groove 34. Finally, the lip 33 is joined to the inclined edge 24 by means of a recess 35.

The flexible branch 21 possesses, between its upper edge 25 and its part 36 surrounding the solid part 26, a shoulder 37, on the inner surface of which a concave surface 38 is formed, matching the convex surface 18, the radii of curvature of these two surfaces therefore being virtually equal. The concave surface 38 is joined to the thinner part 36 by means of an offset 39, on which the radial offset 17 can come to bear when the section 7 and the window 6 have a suitable inclination (FIG. 4).

The concave surface 28 is positioned in such a way that a diametral straight line D passing through its centre (FIG. 4) likewise passes through a point adjacent to the axis of articulation X—X of the branch 19.

The coupling of the section 7 previously fastened to the window 6 and of the section 8 carried by the arm 3 is carried out as follows by a robot (not shown) carrying the window 6, for example by electro-pneumatic suction means.

The window 6 and the section 7 descend above the section 8 at a suitable inclination relative to the vertical (FIG. 3). The section 7 is thus inclined towards the flexible branch 21 and its solid part 12 penetrates between the edges 24, 25 of the funnel and spaces the branch 21 apart. The lip 14 comes up against the lower part of the recess 35, whilst the offset 17 comes into contact with the concave surface 38.

The robot controls the continued descent of the window 6 and of the section 7 as far as the bottom of the section 8.

The branch 21 continues to be spaced apart from the solid part 26 until the lip 14 slides on the lip 33 and comes into contact with the concave surface 28, on which the convex surface 13 consequently also bears (FIG. 4). At the same time, the offset 17 has crossed the separating cant between the concave surface 38 and the offset 39 on which it comes to bear. At the end of this operation, the section 7 is snapped into the section 8, the branch 21 of which has turned down onto the solid part 12. The latter is thus retained between the branches 19 and 21 as a result of the elastic force exerted on the convex surface 18 by the matching concave surface 38 and as a result of the convex surface 16 bearing on the complementary upper part of the recess 35.

It is important to note in this respect that the positioning of the straight line D in relation to the axis X—X, as explained above, opposes the unsnapping of the branch 21 and thus guarantees the retention of the section 7 in the section 8. However, of course, if a sufficiently strong pull is exerted on the section 7 to unsnap it from the section 8, the branch 21 will part and release the section 7. In practice, as an indication, the cross-sections of the sections 7 and 8 can be determined in such a way that the section 7 can lock into the section 8 under a force of 5 kg, whereas a force of 30 kg is necessary to tear it out of it.

In their normal final position, the section 7 and the window 6 are in such a position that the lip 14 comes to rest in the recess 32 and the convex surface 18 comes to bear on the concave surface 38.

After snapping, there is one degree of freedom in terms of rotation of an angle A between the sections 7 and 8, and one degree of freedom in terms of translational motion of the section 8 in relation to the section 7. The angle A (FIG. 4) allows the sections 7 and 8 to pivot on one another during the operating travel of the window 6.

Section 7 is much longer than section 8, so that the latter can slide on the section 7 during the actuations of the window raiser.

The second coupling device 5 will now be described by reference to FIGS. 6 to 10.

This device comprises a single glass support section 42 having a groove 43 designed for receiving the bottom of the window > 6, and means for obtaining, by the snapping of part of this section, a swivel joint on a knuckle-forming sphere 44 fastened to the end of the drive arm 2.

With the section 42 fastened to the window 6, it is coupled to the sphere 44 by shifting the window 6 substantially in its plane and in that of its movement, thus giving the sphere 44 three degrees of freedom in terms of rotation in relation to the section 42. The section 42 includes bifurcated parts 45 and 46 extending in the direction away from groove 43, which bifurcated parts exert compressive forces there between to frictionally grip sphere 44 on arm 2.

The latter comprises a rigid part 45 and a flexible part 46 articulated elastically on the rigid part 45, on which it is normally kept bearing, thus forming with the latter a gripper capable of retaining the sphere 44 as a result of snapping of the elastic part 46 onto the rigid part 45.

Mutually complementary receptacles 47 and 48 of spherical form are arranged opposite to one another in the mutually confronting faces of the two parts 45 and 46 and are designed for receiving the sphere 44. A widened indentation 49 opens into the receptacle 47 of the rigid part 45, which indentation is formed in the lower edge of the part 45 and the edges 49a of which are chamfered to make it easier to introduce the sphere 44 into the receptacle 47.

The articulated part 46 is a lateral strip extending along the bottom of the section 42 and on its sides, substantially as far as the base of the groove 43. This strip 46 is delimited by a recess 51 which is formed in the section 42 and which opens into the face of the latter opposite its rigid part 45. The contour of the recess 51, which on this face forms a slot approximately in the form of a C in the example illustrated, is such that the strip 46 has the form of a handle capable of moving apart elastically from the rigid part 45 in response to a push of the sphere 44.

The edge 52 of the elastic strip 46 is chamfered opposite the indentation 49, to make it easier to move the strip 46 apart and introduce the sphere 44 into its receptacle.

Figure 10:
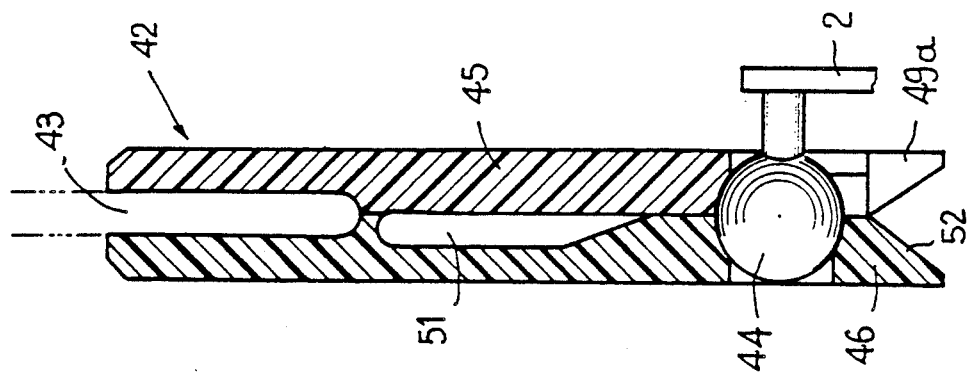
FIGS. 8, 9 and 10 are cross-sectional views according to 8—8 of FIG. 7, illustrating a coupling sequence.
Figure 9:
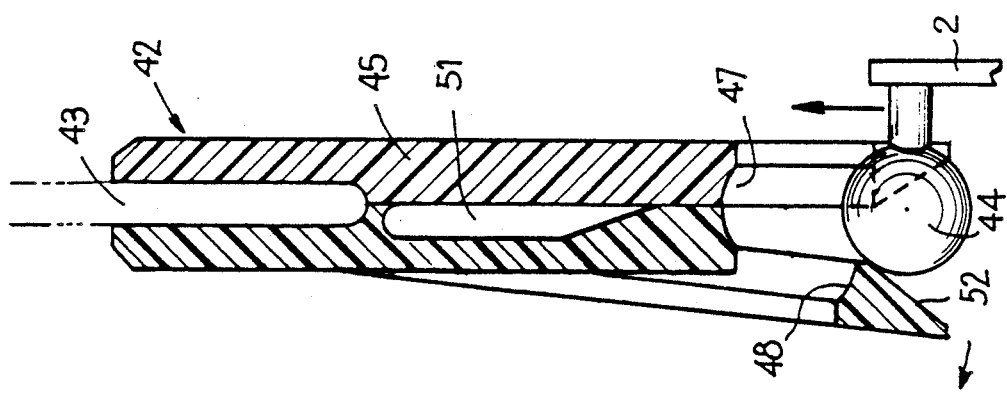
Figure 8:
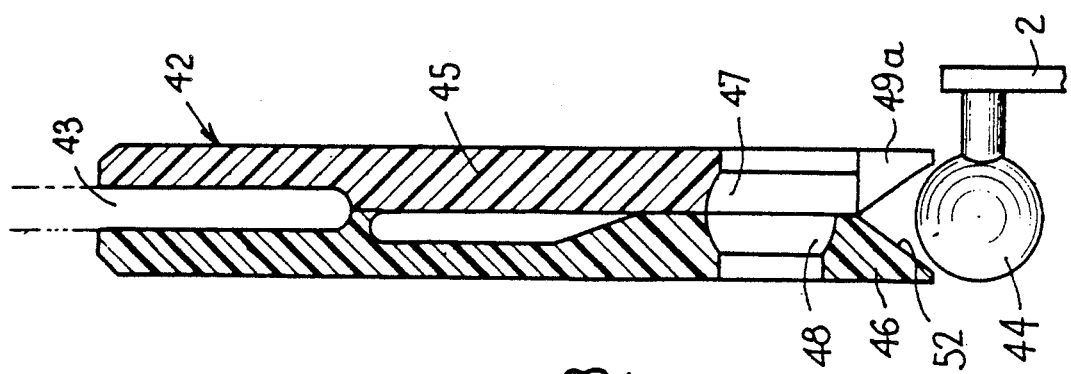

The coupling of the section 42 fastened to the window 6 and of the sphere 44 carried by the arm 2 is illustrated in FIGS. 8 to 10. In FIG. 8, the section 42 is shown with its indentation 49 above the sphere 44. The robot then lowers the window and the section 42, in such a way that the sphere 44 slides onto the chamfered edges 49a and 52, thereby moving the peripheral strip 46 apart elastically (FIG. 9).

The robot continues to lower the section 42 until (FIG. 10) the sphere 44 engages completely into its receptacle 47, 48 after the snapping of the strip 46. (For the sake of convenience, FIGS. 8 to 10 show the section 42 stationary and the sphere 44 movable, whereas in actual fact the opposite is true).

This coupling operation is therefore especially simple because it can be carried out by means of a single vertical translational movement controlled by the robot. After snapping, the sphere 44 and the arm have three degrees of freedom in terms of rotation relative to the section 42.

The coupling between the window 6 and the window raiser 2 can be carried out either, as in the example illustrated in FIG. 1, by means of a device 5 equipped with a section 42 fixed relative to the window 6 and a device 4 equipped with a section 8 sliding relative to the window, or by means of a single device 5 making it possible to connect a window 6 to a window raiser of the "rail" type.

Figure 11:
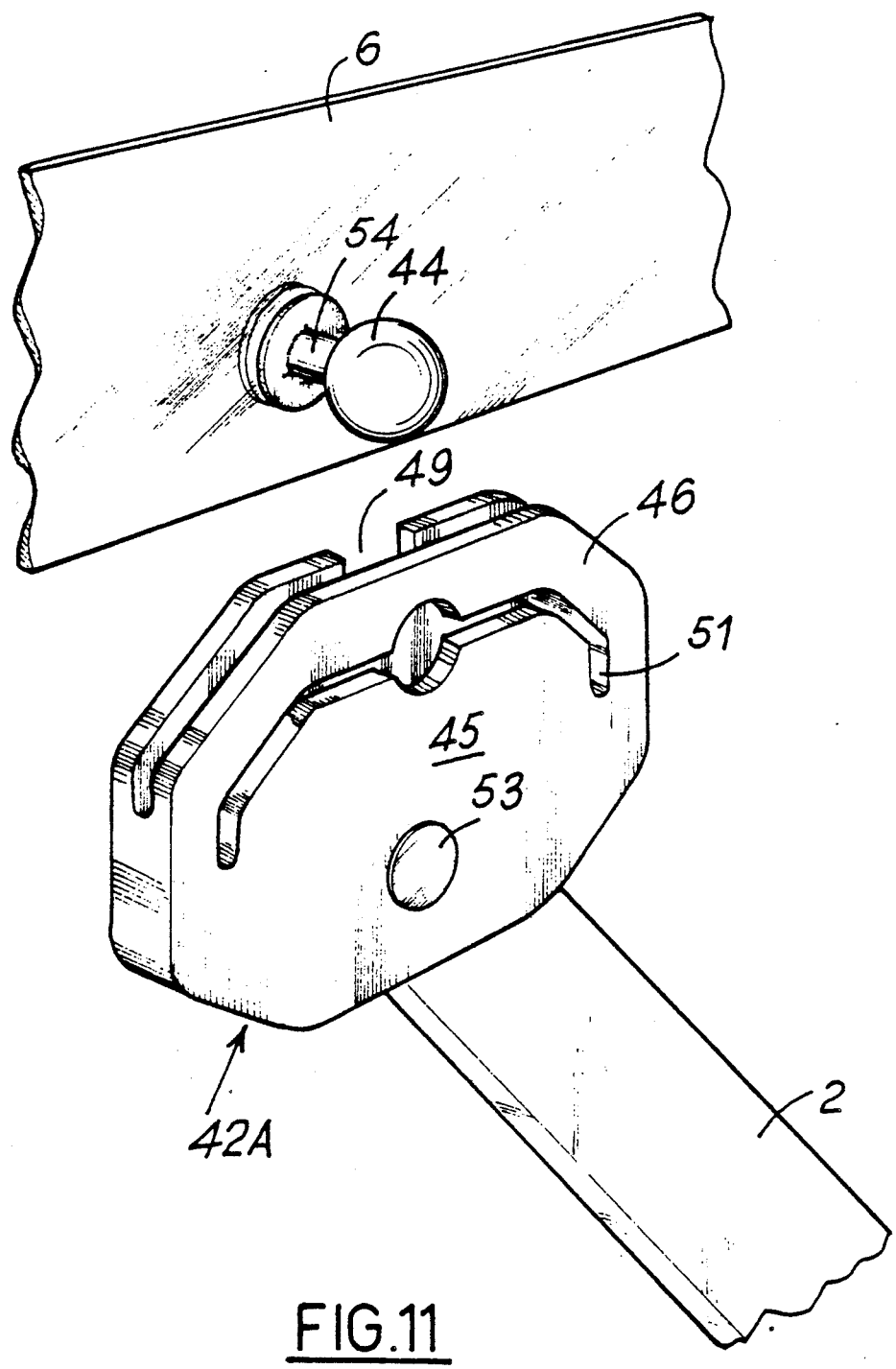
FIG. 11 is a cutaway perspective view of an alternative embodiment of the device of FIGS. 6 and 7.

The possible alternative embodiments include interchanging the gripper of the section 42 and the sphere 44. In fact, the sphere 44 can be carried by the window 6, whilst the gripper (45, 46) can be carried by the arm 2, as shown in FIG. 11. The section 42A forming this gripper (45, 46) is then without the groove 43 and is articulated on the end of the arm 2 by means of an axle 53, whilst the sphere 44 is supported by a foot 54 embedded in the window 6.

I claim:

1. In an automobile window system having a glass mounted for movement between open and closed positions by suitable drive means, the combination comprising:
   (a) a support section (42) operably connected to the automobile window glass to provide support and connection to the drive means;
   (b) a drive arm (2) operably connected to the drive means; and
   (c) a glass support section (42) that includes a rigid part (45) and a flexible part (46) articulated elastically on the rigid part, so as normally to be returned and kept bearing against the said rigid part, forming with the latter a gripper capable of retaining a coupling sphere (44) disposed on the said drive arm (2), as a result of the snapping of the elastic part (46) into the rigid part (45).

2. The combination as defined in claim 1, wherein receptacles (47, 48) of mutually complementary form are provided opposite one another in the mutually confronting faces of the two parts (45, 46) of the section (42) and are designed for receiving said sphere (44), and a widened indentation (49), formed in the edge of the rigid part (45) to facilitate introduction of the sphere (44) into the receptacles (47, 48).

3. The combination as defined in claim 1, wherein said articulated part (46) is a lateral strip delimited by a recess (51) which is formed in said articulated part and opens into the face of the section (42) opposite its rigid part (45) and the contour of which is such that the strip (46) has the form of a handle capable of moving apart elastically from the rigid part (45) under a push of the sphere (44) and then of snapping onto the latter.

4. The combination as defined in claim 3, wherein said rigid part (45) and said elastic part (46) are chamfered to provide edges 52 opposite the indentation (49) of the rigid part (45), as are the edges (49a) of the said indentation 49, in order to make it easier to move the elastic part (46) apart and introduce the sphere (44) into its receptacle (47, 48).

5. The combination as defined in claim 1 wherein said glass support section (42) and said drive arm (2) comprises two frictionally joined coupling elements having cooperating arcuate surfaces that enable a universal rotational movement with respect to each other.

6. The combination as defined in claim 5 wherein said support section (42) is bifurcated in the direction away from the window glass to form two parts (45), (46) having compressive forces there between to grip said coupling element on said drive arm and forms the universal connection.

* * * * *